May 29, 1962            J. BOWE            3,036,532

COTTON CANDY MACHINE WITH PRODUCT OF ALTERNATING COLORS

Filed June 28, 1960            2 Sheets-Sheet 1

INVENTOR.
JOHN BOWE
BY Morse Altman
ATTORNEYS

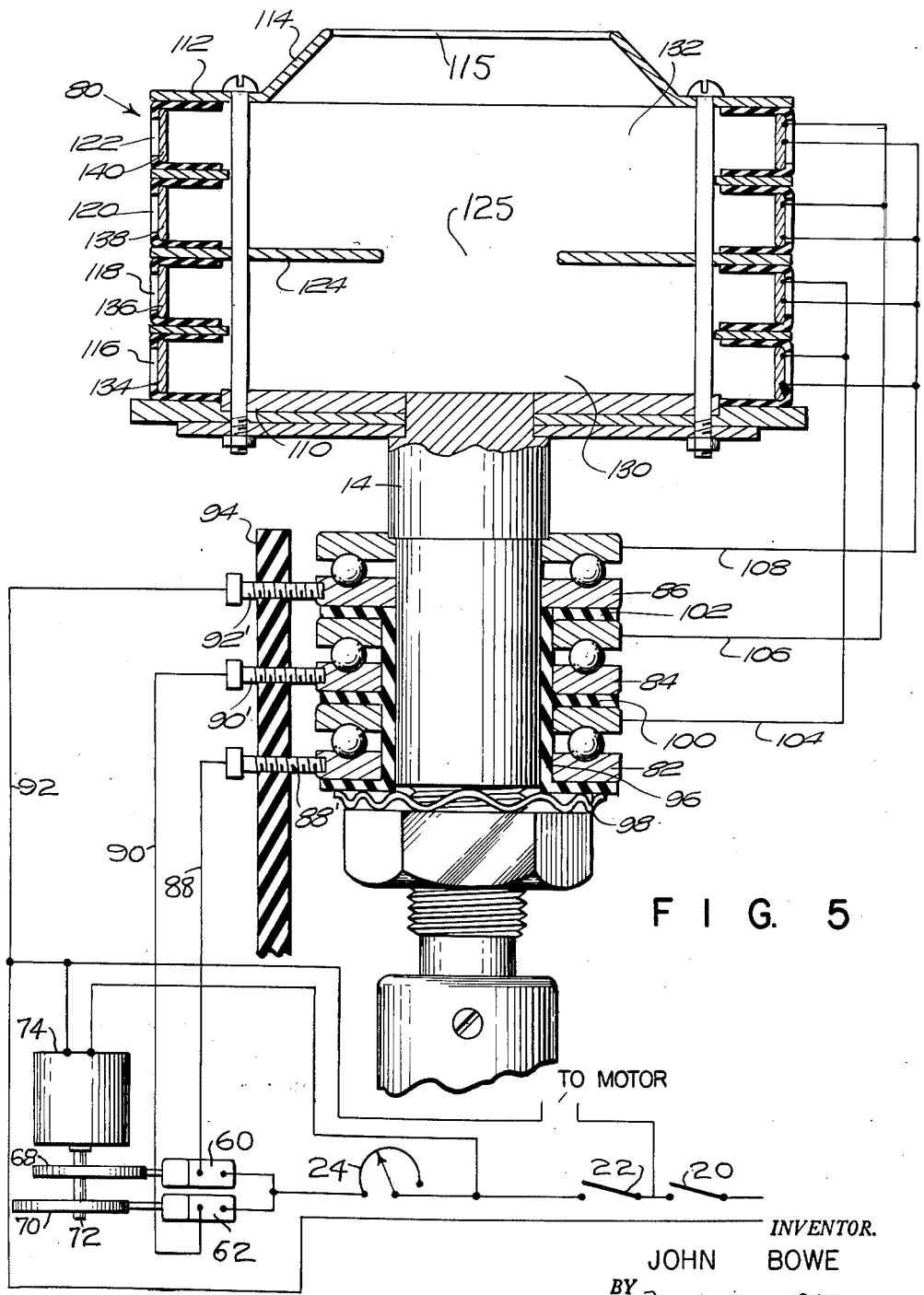

United States Patent Office 3,036,532
Patented May 29, 1962

3,036,532
COTTON CANDY MACHINE WITH PRODUCT OF ALTERNATING COLORS
John Bowe, 29 Maple St., Salisbury, Mass.
Filed June 28, 1960, Ser. No. 39,277
3 Claims. (Cl. 107—8)

This invention relates to a machine for making from ordinary cane sugar "cotton candy" or "sugar floss" in the form of fine fluffy filaments of sugar. To add to the attractive appearance of the product, the sugar which is supplied to the machine may previously have been colored by suitable edible dyes. The machine includes a spinner head which is a cylindrical container mounted on the upper end of a vertical shaft which is rotated at high speed. The container has a horizontal partition member which divides it into two compartments of equal height, one over the other. Sugars of different colors can be fed into the individual compartments. In the operation of the machine it is important to insert equal quantities of sugar of different colors into the two compartments and to spin floss alternately from the two compartments in equal intervals so that the sugar supplies in the two compartments will use up at the same rate. Hence, according to the invention, the heating units in the two compartments are automatically operated in alternation for equal intervals of time so that the cotton candy issuing from the machine will be in one color for a certain period and then in the other color for a like period.

A further object of the invention is to provide electrical connections for the heating units within the container to a source of electric power, dispensing with the customary brushes and slip-rings and using instead shaft bearing elements which are insulated from one another.

Further advantageous features of the invention will be apparent from the following description of the invention and from the drawings, in which:

FIGURE 5 is a sectional view of a modified form of spinning head together with the shaft, shaft bearings, and electrical circuits.

Figure 1:
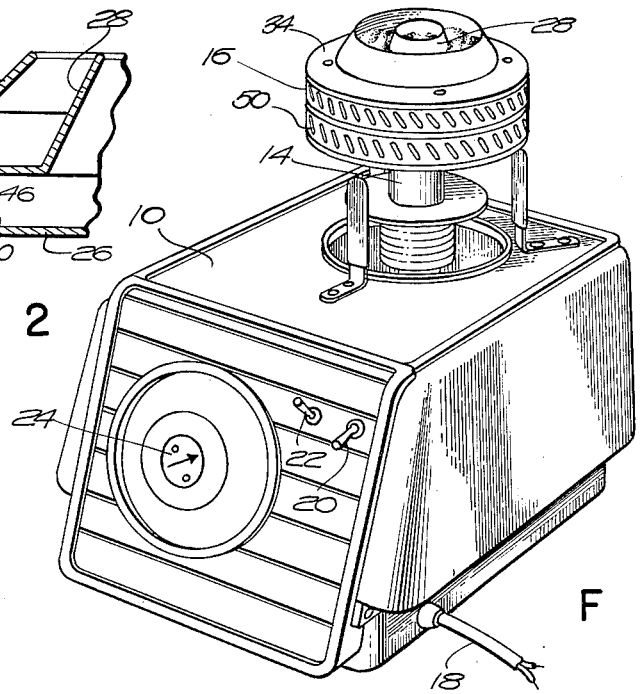
FIGURE 1 is a perspective view of a sugar spinning machine.

A sugar spinning machine is illustrated in FIGURE 1, comprising a housing 10 within which is mounted a motor 12 having a vertical shaft 14 which extends up through the top of the housing. Mounted on the upper end of the shaft 14 is a spinning head 16 which is rotated at high speed by the motor 12. Electric current is supplied to the machine by a cable 18 which can be plugged into any convenient source of electric power. On the front panel of the housing 10 are control switches 20 and 22, the former being the master switch for the entire mechanism, the latter switch controlling the heating units. A rheostat 24 for regulating the current to the heating units is operated by a knob on the front panel.

Figure 2:
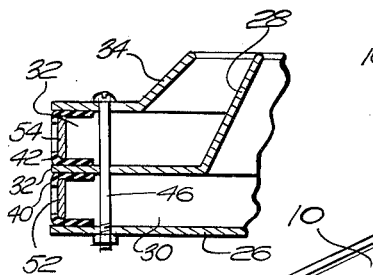
FIGURE 2 is a fragmentary sectional view, on a larger scale, of the spinning head shown in FIGURE 1.
Figure 3:
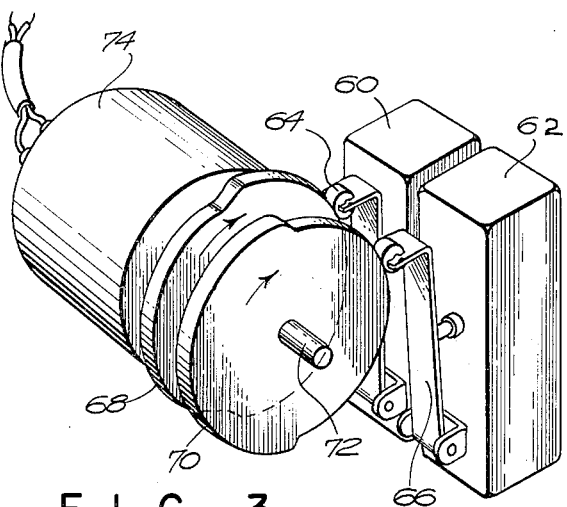
FIGURE 3 is an enlarged perspective view, on an enlarged scale, of automatic control switches for the heating units.

The spinning head illustrated in FIGURES 1 and 2 consists of a container, the bottom of which is a circular plate 26. This container has a partition member 28, which divides it into a lower compartment 30 and an upper compartment 32, and a top member 34. The side walls of the container 16 consist of two short tubular members 40 and 42 which are porcelain coated so as to act as electrical insulators. Each of these members has a pair of inwardly extending flanges, the flanges of the member 40 bearing respectively against the disk 26 and the partition member 32, the flanges of the wall member 42 bearing against the partition member 32 and the top member 34. A series of long screws 46 may be used to hold the parts of the spinning head in assembled relation. Each of the wall members 40 and 42 has a series of apertures in the form of inclined slots 50 therethrough, as indicated in FIGURE 1. Fitted within the members 40 and 42 are heating units 52 and 54. Each of these units consists of a narrow ribbon of resistance wire wound into a flat coil which is curved into shape to bear against the inner surface of one of the wall members 40 or 42. Current is supplied to the end of each of these coils to heat it to a desired temperature during the operation of the machine. If sugar of different colors is placed respectively in the compartments 30 and 32, it is desirable that the heating units 52 and 54 be operated in alternation so that one color product will issue at a time. It is also very desirable that these alternate operations of the two heating units be for the same periods so that the sugar in the two compartments will be used up evenly. For this purpose microswitches 60 and 62 are connected into the respective circuits supplying the two heating units 52 and 54 with electric current. As indicated in FIGURE 3, the microswitches 60 and 62 are operated by cam followers 64 and 66, respectively, which bear against cam disks 68 and 70. These are mounted on a shaft 72 which is slowly rotated by a motor in the casing 74, the motor (not shown) being connected to the shaft 72 by suitable reduction gearing. Such reduction gearing may be selected to provide a rotation of the shaft 72 at any desired speed, e.g., one every 20 seconds or so. At the end of each half revolution the cams 68 and 70 operate to open one of the micro-switches and to close the other in alternation so that the heating units 52 and 54 are energized for 10-second intervals in alternation. As the result of this operation of the current controlling mechanism, sugar floss issues through the apertures 50 of the lower wall member 40 for a given period and then through the apertures of the upper wall member 42 for an equal period, and then again through the apertures of the lower member 40, and so on.

Figure 4:
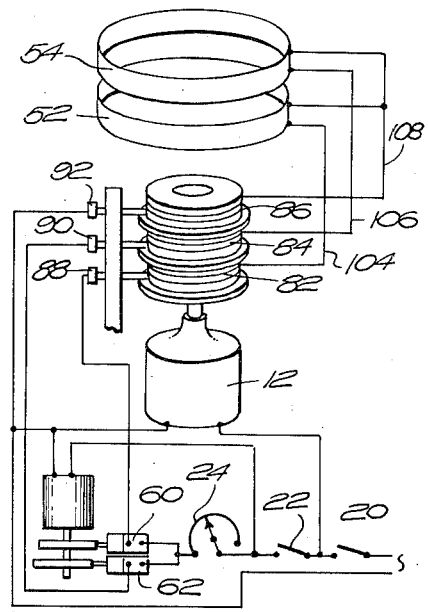
FIGURE 4 is a wiring diagram of the machine.

In order to avoid difficulty with electric brushes and slip-rings, shaft bearings are used as electrical conducting elements, as indicated in FIGURE 4, to lead current into the revolving head which contains the heating units. These bearings are shown in more detail in FIGURE 5 in connection with a spinning head 80 of modified design, hereinafter described. Three bearings 82, 84 and 86 are provided for the shaft 14, these bearings being electrically insulated from one another. The lower ball races of these bearings are stationary and are electrically connected respectively to wires 88, 90 and 92 by means of screws 88', 90' and 92' which are supported by a member 94 of insulation and enter the respective lower ball races of the bearings. As shown in FIGURES 4 and 5, the wire 92 leads to one pole of a source of electric power. The wires 88 and 90 lead through respective switches 60 and 62 to the rheostat 24 and thence through the switches 22 and 20 to the other pole of the source of electric power. The bearings are insulated from one another by insulating members such as a tube or sleeve 96 which is between the bearings 82 and 84 and the shaft 14, and washers of insulating material 98, 100 and 102. The upper ball race members of the bearings 82, 84 and 86 are connected respectively to wires 104, 106 and 108, these wires leading to the heating units in the spinning head.

The spinning head 80 illustrated in FIGURE 5 is somewhat different from the one illustrated in FIGURE 1. The former has a bottom plate 110 secured to the upper end of the shaft 14, a top plate 112 with a frusto-conical portion 114 surrounding a central opening 115 through which sugar may be introduced into the spinning head. The side walls of the spinning head consist chiefly of four insulating elements 116, 118, 120 and 122, these being preferably similar in structure to the wall elements 40 and 42 hereinbefore described. The lower two wall elements 116 and 118 are separated from the upper two elements 120 and 122 by a horizontal partition member consisting of a disk 124 having a central opening 125 therein. This divides the interior of the container 80 into a lower compartment 130 and an upper compartment 132. The opening 125 is smaller than the opening 115 but is large enough for receiving sugar into the lower compartment 130.

Against the inner face of each of the wall elements 116, 118, 120 and 122 are heating units 134, 136, 138 and 140, respectively. These units are preferably similar in construction to the units 52 and 54 hereinbefore described. The units 134 and 136 are in the lower compartment so that one end of each unit is connected to the wire 104, the other end of each of these units being connected to the wire 108. In like manner one end of each of the units 138 and 140 is connected to the wire 106, the other end of each of these units being connected to the wire 108. These units fuse the sugar which is against them when the spinning head is in operation, that is, when it is rotating at high speed. The fused sugar is discharged centrifugally through the small openings in the insulating wall members. In FIG. 5 the wiring connecting the heating units with the ball bearings is diagrammatically shown as being outside of the spinning head. In actual construction the wires are inside of the head and lead down through the shaft 14 which is hollow, the connections to the bearings being made through small holes (not shown) in the wall of the shaft.

I claim:
1. A machine for spinning sugar into filaments, comprising a vertical rotatable shaft, a container having cylindrical side walls mounted on said shaft coaxial and rotatable therewith, a horizontal partition member dividing said container into upper and lower compartments of equal height, said partition member extending to said side walls and having a central aperture, the side walls of each compartment having a series of apertures therethrough, a separate heating unit in each said compartment disposed against the side wall of the compartment and covering the apertures thereof, an electric circuit for each said unit including a switch, means for automatically operating said switches to close said circuits alternately for equal intervals, and means for rotating said shaft.

2. A machine as described in claim 1, said machine including a plurality of bearings for said shaft electrically insulated from each other, each said circuit including one of said bearings.

3. A machine as described in claim 1, said container having a top member with a central aperture, said partition member consisting of an annular disc the aperture of which is smaller than the aperture in said top member.

References Cited in the file of this patent

UNITED STATES PATENTS

| | | |
|---|---|---|
| 816,055 | Zoeller | Mar. 27, 1906 |
| 847,366 | Pollock | Mar. 19, 1907 |
| 1,489,342 | Brent | Apr. 8, 1924 |
| 1,649,276 | Adam | Nov. 15, 1927 |

FOREIGN PATENTS

| | | |
|---|---|---|
| 22,138 | Great Britain | Oct. 7, 1911 |